(12) United States Patent
Stefan

(10) Patent No.: US 9,505,403 B2
(45) Date of Patent: Nov. 29, 2016

(54) PARKING ASSISTANCE SYSTEM

(71) Applicant: FORD GLOBAL TECHNOLOGIES, LLC, Dearborn, MI (US)

(72) Inventor: Frederic Stefan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/712,757

(22) Filed: May 14, 2015

(65) Prior Publication Data

US 2015/0329110 A1    Nov. 19, 2015

(30) Foreign Application Priority Data

May 15, 2014    (DE) ................... 10 2014 209 227

(51) Int. Cl.
| | |
|---|---|
| *B60W 30/06* | (2006.01) |
| *B60Q 9/00* | (2006.01) |
| *B60W 50/08* | (2012.01) |
| *B60K 28/12* | (2006.01) |
| *B62D 15/02* | (2006.01) |

(52) U.S. Cl.
CPC .............. *B60W 30/06* (2013.01); *B60K 28/12* (2013.01); *B60Q 9/002* (2013.01); *B60W 50/082* (2013.01); *B62D 15/0285* (2013.01); *B60W 2510/186* (2013.01)

(58) Field of Classification Search
CPC ... B60Q 9/002; B60W 30/06; B60W 50/082; B60W 2510/186; B62D 15/0285; B60K 28/12
See application file for complete search history.

(56) References Cited

U.S. PATENT DOCUMENTS

| | | | |
|---|---|---|---|
| 2003/0004613 A1 | 1/2003 | Hahn et al. | |
| 2010/0106372 A1* | 4/2010 | Watanabe | B62D 15/0285 |
| | | | 701/41 |
| 2012/0047001 A1* | 2/2012 | Chagnon | G06Q 10/08 |
| | | | 705/13 |
| 2013/0231824 A1* | 9/2013 | Wilson | G05D 1/0088 |
| | | | 701/26 |
| 2013/0289825 A1* | 10/2013 | Noh | B62D 15/027 |
| | | | 701/42 |
| 2014/0222252 A1 | 8/2014 | Matters et al. | |
| 2014/0379197 A1 | 12/2014 | Eckert et al. | |
| 2015/0015710 A1* | 1/2015 | Tiryaki | B60R 1/00 |
| | | | 348/148 |
| 2015/0203111 A1 | 7/2015 | Bonnet et al. | |

(Continued)

FOREIGN PATENT DOCUMENTS

| | | |
|---|---|---|
| DE | 102004027869 A1 | 1/2006 |
| DE | 102008051982 A1 | 6/2009 |

(Continued)

OTHER PUBLICATIONS

German Patent and Trademark Office, Examination Report for the corresponding German Patent Application No. 10 2014 209 228.0 dated Sep. 24, 2014.

*Primary Examiner* — Rodney Butler
(74) *Attorney, Agent, or Firm* — Franklin A. MacKenzie; Brooks Kushman P.C.

(57) ABSTRACT

A parking assistance system for supporting a parking maneuver of a motor vehicle, during which the motor vehicle is automatically moved into a parked position. The parking assistance system has an unloading mode that can be activated by a user to enable the unloading of an object and/or to enable the disembarkation of a passenger before completion of the parking maneuver, wherein a temporary stop of the motor vehicle in an unloading position is automatically caused before reaching the parked position in response to the activation of said unloading mode.

20 Claims, 3 Drawing Sheets

(56) References Cited

U.S. PATENT DOCUMENTS

2015/0360625 A1 12/2015 Randler et al.
2015/0370255 A1* 12/2015 Harvey .............. B62D 15/0285
                                                        701/24

FOREIGN PATENT DOCUMENTS

DE   102012201038 A1   7/2013
EP       2289768 A2    3/2011

* cited by examiner

PARKING ASSISTANCE SYSTEM

CROSS-REFERENCE TO RELATED APPLICATIONS

This application claims foreign priority benefits under 35 U.S.C. §119(a)-(d) to DE 10 2014 209 227.2 filed May 15, 2014, which is hereby incorporated by reference in its entirety.

TECHNICAL FIELD

The invention relates to a parking assistance system for supporting a parking maneuver of a motor vehicle, during which the motor vehicle is automatically brought into a parked position.

BACKGROUND

Recently developed parking assistance systems are capable of undertaking both the lateral control of a motor vehicle by means of the vehicle steering system and also the longitudinal control using control of the gas pedal, brake pedal and gearbox for fully automatically performing a parking maneuver. The driver is still always responsible during this for monitoring the maneuver, for example by continuously operating an activation button.

With such parking assistance systems, certain modes can be provided, for example in the form of a "pause mode" and of an "abort mode." During the "pause mode" the motor vehicle will be immediately brought to a stop on entering a defined "pause condition" and will be held at a stop by means of the vehicle brakes, which can occur for example if the driver releases the activation button, an object is detected at a greater distance or the passenger door is opened. Once the pause condition is no longer fulfilled, the parking maneuver is resumed. Moreover, the pause mode is typically limited in time, wherein the parking maneuver is aborted after a predefined period of time has elapsed (for example 3 minutes). In the "abort mode" the motor vehicle is immediately brought to a stop and is kept at a stop if an abort condition occurs. This can be the case for example if the driver's door opens, the gear shift is operated or an object is detected in the immediate vicinity of the motor vehicle. In this case the parking brake is preferably operated, such that no resumption of the maneuver is possible. During the parking maneuver itself, typically the stop-start mode is deactivated in order to prevent unwanted switch-off of the engine.

The path of motion or "path" followed by the vehicle during the parking process as well as the final or "parked" position of the motor vehicle in a defined parking space is determined such that the available parking area is used optimally. Thus for example in a relatively small parking space the parked position of the motor vehicle is selected accurately in the center of the parking space, whereas in a larger parking space the positioning of the motor vehicle can be selected for example closer to the vehicle in front.

In certain operating situations, however, the operating modes described above may not provide desired functionality. Thus for example the situation can occur in which a person with restricted mobility (for example an older person, a pregnant woman, a wheelchair user, an injured person etc.) wishes to disembark from the motor vehicle. Because such persons typically need more space to disembark, it can be necessary to fully open the respective vehicle door for this, and a longer period of time may generally also be required by such persons to disembark. Depending on the current ambient conditions, the path provided for the parking process and the strategy provided for orientation of the motor vehicle can prove to be non-optimal. Furthermore, the case can occur in which a pause mode that may be in use is fully deactivated if the disembarkation process lasts too long, so that the driver is then required to complete the maneuver manually. In addition, the engine is running during the entire period of time of the disembarkation process.

Furthermore, for example a situation can also occur in which the driver of a motor vehicle, in which large or long objects (for example furniture, luggage, a refrigerator etc.) are being transported, requires additional space to remove said objects from the vehicle. Removing such objects from the trunk, rear hatch, or tail-gate may require a free space of considerable size to the rear of the motor vehicle. Depending on the respective ambient conditions, the path provided for the parking process (for example when parking in a parked position perpendicular to the road) as well as the strategy for orientation of the motor vehicle can also prove to be non-optimal in this case. Even if the pause mode is used, here too the case can occur in which the parking assistance system is fully deactivated if the driver needs too long a period of time to unload the motor vehicle, so that the driver can also be required in this case to complete the maneuver manually. Furthermore, the engine is also running during the entire unloading process.

In other situations the case can occur in which an automatic transition into the abort mode takes place as a result of certain actions of the driver during the unloading process, for example if the driver operates the parking brake, moves the gear shift into the park position or the driver's door opens.

SUMMARY

A parking assistance system for supporting a parking maneuver of a motor vehicle, during which the motor vehicle is automatically moved into a parked position, has an unloading mode that can be activated by a user to enable the loading and/or unloading of the vehicle (objects and/or passengers) before completion of the parking maneuver, wherein in response to the activation of the unloading mode a temporary stop of the motor vehicle in an unloading position is automatically caused before reaching the parked position.

An additional and new type of mode in the form of an "unloading mode" is provided, wherein said unloading mode can be activated by the driver either before the start of a parking maneuver or alternatively during the parking maneuver.

According to one embodiment, the parking assistance system is configured (most commonly, in the case of activation of the unloading mode taking place before the start of the parking maneuver) to determine the path to be driven by the motor vehicle to reach the parked position depending on a region of the motor vehicle that can be specified by the user and from which the unloading and/or loading is intended to take place.

According to one embodiment, the parking assistance system is configured to determine a path to be driven by the motor vehicle to the parked position depending on a free distance to be left adjacent to an unloading region of the motor vehicle that can be specified by the user.

Thus if the unloading mode is activated before the start of a parking maneuver, the driver is given the option, for example by means of a suitable HMI interface (HMI="Human-Machine-Interface"), to specify a region of the motor vehicle from which the vehicle is to be unloaded. A suitably modified parking path may then be determined depending on the nature of the parking space provided for the parking process, and an intermediate stop at the optimal unloading position can be planned or offered. Then suitable correcting maneuvers can be offered, by means of which the final parked position can be achieved.

According to one embodiment, the parking assistance system is configured to cause an immediate stop of the motor vehicle in the case of activation of the unloading mode taking place after the start of the parking maneuver. If the unloading mode is thus activated after the parking maneuver has already been started, the motor vehicle is brought to a stop and the current position of the motor vehicle pertaining at said point in time constitutes the unloading position.

According to one embodiment, the parking assistance system is configured to resume a parking maneuver having been started before a stop after said stop of the motor vehicle in the unloading position that is caused in response to a user input. During this, in particular an automatic check of the state of one or more systems of the vehicle, in particular of the opening state of the vehicle doors or the position of the gearshift selector, can take place before said resumption of the parking maneuver. Furthermore, a signal to the user and/or a request to change the state of the vehicle system(s) may be issued depending on the result of said check.

According to one embodiment, the parking assistance system is configured to ignore the existence of any abort condition that would trigger a final abort of the parking maneuver outside of the unloading mode, in particular exceeding a stopped time period of the motor vehicle, operation of the parking brake or of the gearshift selector, regarding the continuation of the parking maneuver. In other words, such an abort signal or condition is ignored so that for example even after a long-lasting unloading process a final and unwanted termination of the parking maneuver does not take place, but a resumption of the parking maneuver takes place after the fully completed unloading process.

According to one embodiment, the parking assistance system is configured to automatically activate a parking brake after reaching the unloading position.

According to one embodiment, the parking assistance system is configured to automatically switch off the engine of the motor vehicle after reaching the unloading position.

The concept according to the invention can generally also be implemented in applications with remote control parking.

The invention is described in detail below using exemplary embodiments shown in the accompanying figures. In the figures:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Furthermore, a possible operation of the parking assistance system according to the invention is described with reference to the flow chart shown in FIG. 1 as well as to the schematic representations of FIGS. 2A-C and FIGS. 3A-C.

Figure 2A:
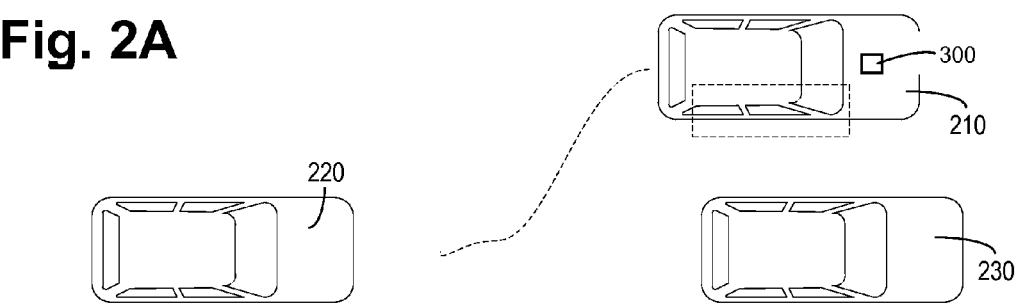
FIGS. 2A-C shows schematic representations for the illustration of a parking process in a possible embodiment.
Figure 2B:
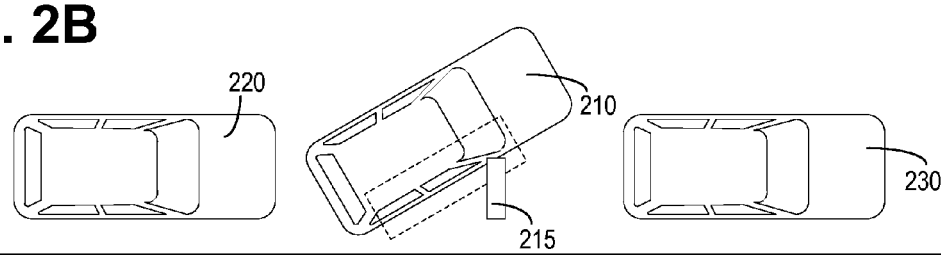
Figure 2C:
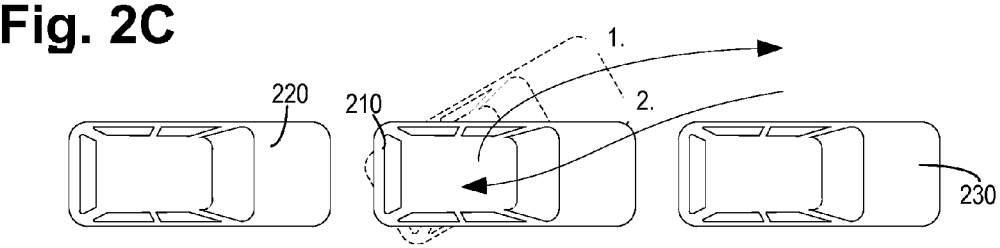

In FIGS. 2A-C a parking process according to one possible embodiment is shown schematically, wherein an automatic parking maneuver takes place to enter a parking space identified by the system that is generally parallel to the road, curb, or direction of travel. A motor vehicle 210 is equipped with a parking assistance system 300 operative to perform the parking process, wherein when parking between two other motor vehicles 220, 230 a temporary stop is carried out in an unloading position indicated in FIG. 2B. The depicted unloading position is determined by the parking assistance system to facilitate access to the right or passenger side of the vehicle by stopping the vehicle in a position at which there is additional distance (as compared with the parked position) between the vehicle and the adjacent edge of the parking space so that the passenger door 215 may be opened and the vehicle more conveniently unloaded or loaded (for example, for a person to disembark or board the vehicle). FIG. 2C shows the vehicle 210 in the parked position.

Figure 3A:
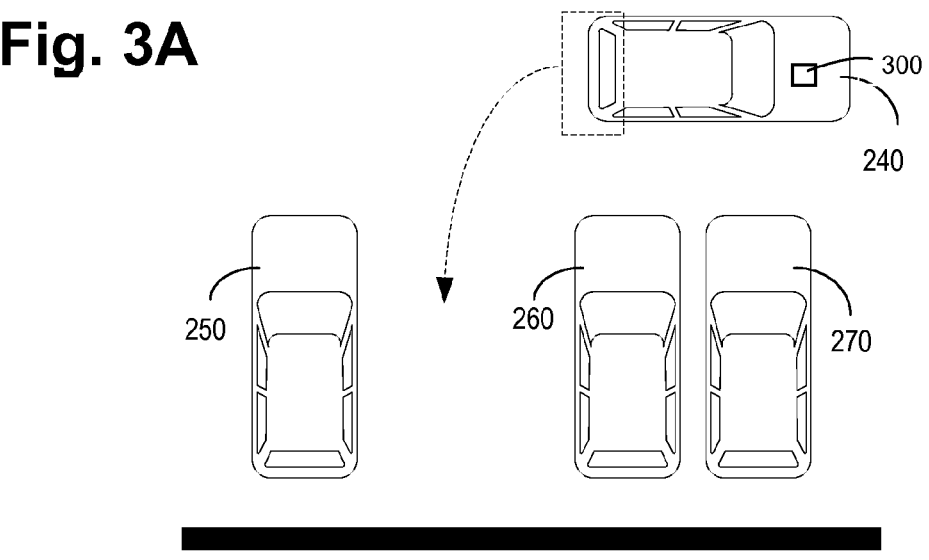
FIGS. 3A-C shows schematic representations for the illustration of a parking process in another possible embodiment.
Figure 3B:
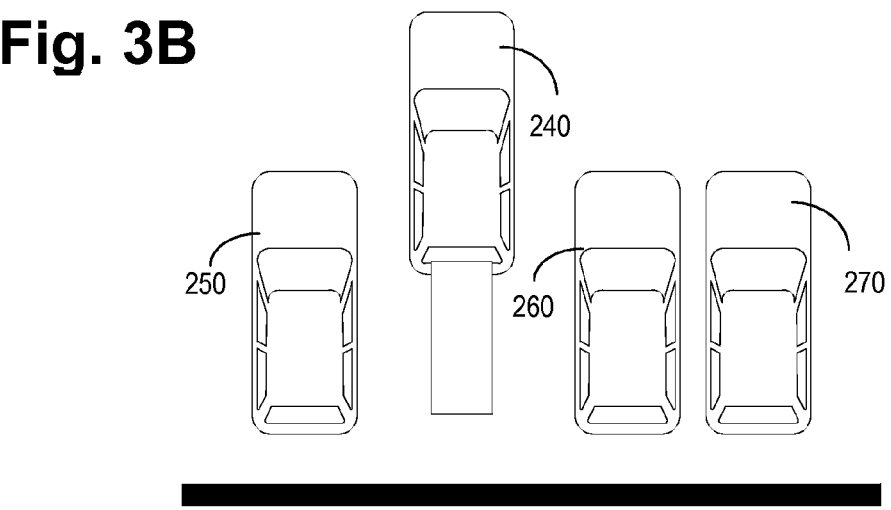
Figure 3C:
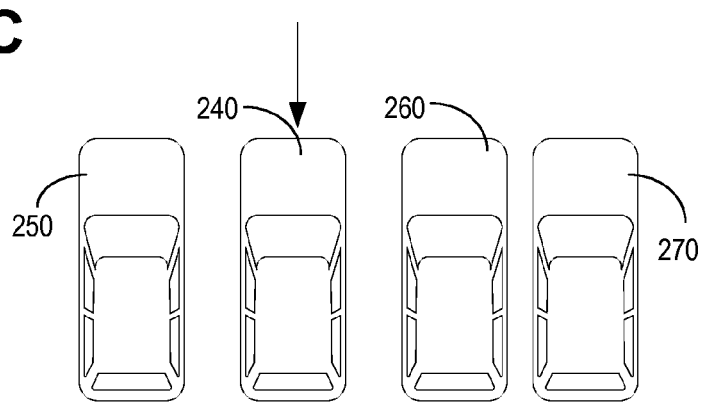

In FIGS. 3A-C a parking process in another possible embodiment is shown schematically, wherein a motor vehicle 240 equipped with a parking assistance system 300 operative to perform the parking process, wherein the automatic parking maneuver is carried out to enter a parking space identified by the system that is generally perpendicular to the road, curb, or direction of travel. Starting from the situation according to FIG. 3A, the motor vehicle 240 comes to a stop in an unloading position according to FIG. 3B where there is additional distance (as compared with the parked position) between the rear of the vehicle and the adjacent edge of the parking space so that unloading of the vehicle through the rear (trunk, hatch, tail-gate, etc.) is facilitated before the vehicle 240 completes the parking maneuver and reaches the parked position as shown in FIG. 3C.

Figure 1:
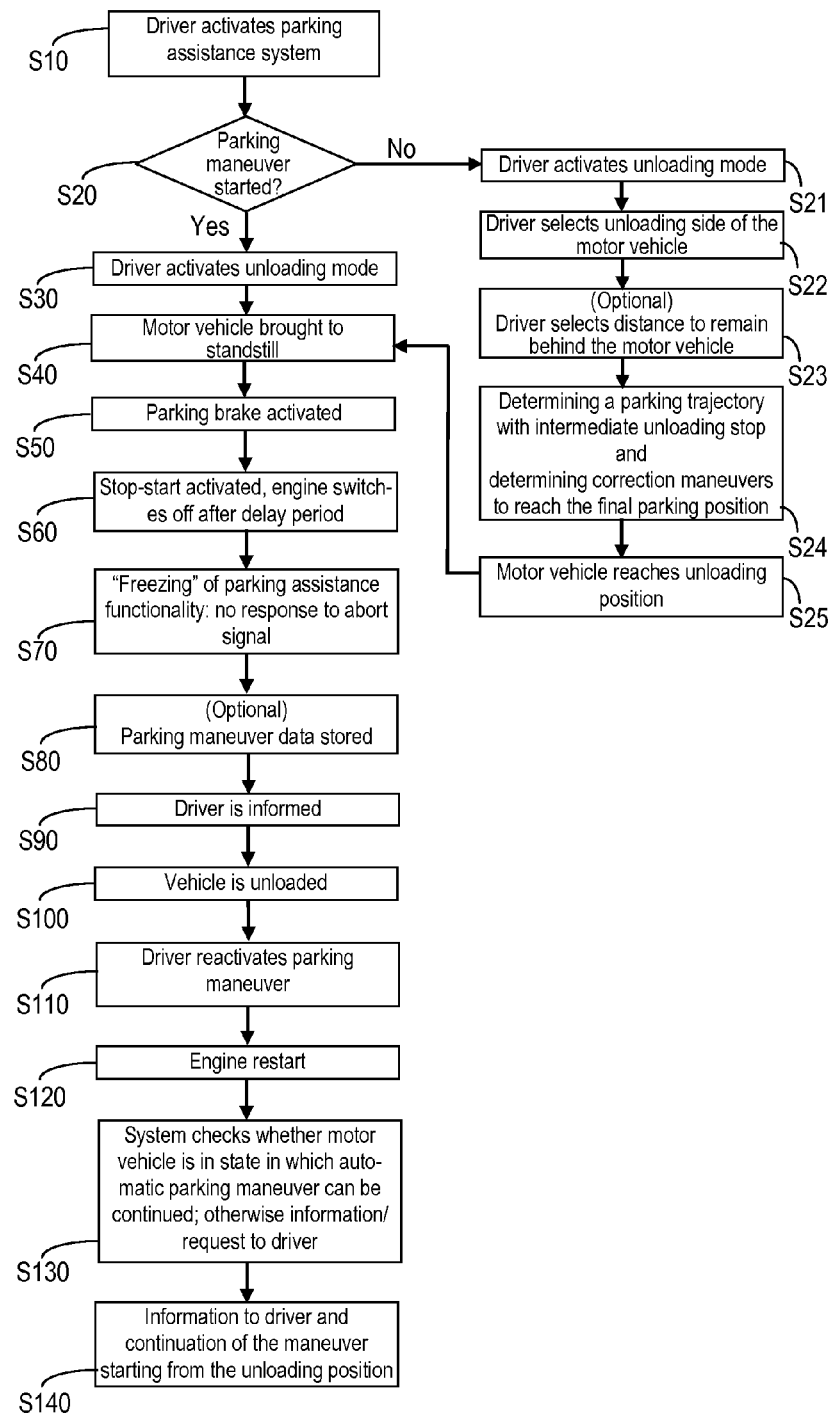
FIG. 1 shows a flow chart for explaining a possible operation of the parking assistance system according to the invention in one embodiment.

The process shown in FIG. 1 assumes that the driver of a motor vehicle wishes to perform a parking process, has activated the parking assistance system (step S10), and further wishes to unload the motor vehicle, such as to remove and/or load an object and/or allow a person to disembark and/or board the motor vehicle.

In step S20 a query is first made as to whether the automatic parking maneuver has already started. The automatic parking system may institute a short time delay between the activation of the parking assistance system by the driver at step S10 and the start of the parking maneuver at S20, the delay allowing the driver to activate the unloading mode prior to the start. If "YES," and the driver subsequently activates the "unloading mode" in step S30, the motor vehicle is brought to a stop in step S40. In this case, the position of the vehicle when the driver activates the unloading mode constitutes or defines the unloading position.

If the automatic parking maneuver has not started yet according to the query in step S20 ("NO"), the driver activates the "unloading mode" in step S21, and selects in step S22 the unloading region of the motor vehicle from or adjacent which the vehicle is to be unloaded. The unloading region may be any portion or side of the vehicle, such as for example the left side, right side (as depicted in FIG. 2), or rear (as is depicted in FIG. 3). The driver may optionally further select a distance to be left free between the loading region and an adjacent edge of the parking space (as identified by the parking assistant system) in an optional step S23.

The determination of a parking path to be followed by the vehicle is accomplished by the parking assistance system. This parking path is determined by taking into account or planning in an intermediate stop in an unloading position as well as the determination of necessary (correction) maneuvers to reach the parked position (step S24). In step S25 the motor vehicle reaches the unloading position, whereupon a transition takes place to step S40, in which the motor vehicle is brought to a stop.

In step S50 the vehicle's parking brake is activated. The parking brake may, as is known in the art, be an electrically actuated brake. Thereupon activation of the stop-start function takes place in step S60, wherein the engine is switched off—possibly following a brief interruption or waiting period. In step S70 any functionality of the system which would normally, as in a prior art parking assistant system, cause the parking maneuver to be aborted in response to a corresponding signal (driver's door open, maximum time expired, etc.) is deactivated. In other words, after said deactivation there is no abort of the parking maneuver in response to this signal until further notice, which typically will come only after the unloading event is complete and the driver is ready to resume the parking maneuver. In step S80 the data of the parking maneuver can optionally be stored in a memory. After notifying the driver in step S90 that the vehicle is in the proper condition for unloading, the vehicle may be unloaded in step S100.

When unloading is complete, the driver reactivates the parking assistance maneuver in step S110, whereupon the engine is re-started in step S120. In step S130 a check is made as to whether one or more systems of the motor vehicle is/are in a state in which it is appropriate for the automatic parking maneuver to be continued (for example whether the doors are closed and/or the gear shift is in the suitable position). If this is not the case, the driver is notified accordingly, so that the driver can first change the motor vehicle system(s) into the required state.

For resumption of the parking maneuver, the driver has to first set the motor vehicle into a state in which automatic vehicle operation by means of the parking assistance system is permissible (i.e. all doors closed, gear shift in the N-position etc.). The state of the motor vehicle can be checked for this, and the driver may be requested to correct the state by means of the HMI interface. The engine can be re-started by the operation of a suitable activation button, whereupon the parking maneuver is resumed. In the event of a need for additional correcting maneuvers, these are automatically initiated by the parking assistance system in order to reach the optimal parked position (wherein for example in FIG. 2 a suitable path is shown by arrows).

Once the motor vehicle is in a state that enables the continuation of the parking maneuver, the driver is informed in step S140 and the parking maneuver is continued starting from the unloading position.

The steps carried out after reaching the unloading position can thus be as follows:

The motor vehicle is brought to a stop and kept at a stop by means of the brake.

The parking brake is automatically activated (or the driver has to operate the parking brake), whereupon the brake pedal can be released again.

The stop-start function is activated and the engine is switched off after a predefined period of time (for example 10 seconds).

The driver is informed.

The state of the parking assistance system remains "frozen" regardless of any measures of the driver (for example changing the gearshift selector position, opening any doors, operation of the steering wheel, operation of the pedals etc.), so that there is no response to such measures or to a corresponding abort signal (i.e. in particular no final termination of the maneuver). However, the parking assistance system can still be deactivated by the driver at any time by means of a suitable HMI interface, or a switch-off of the ignition can be performed in order to terminate the "frozen state".

The further planned parking maneuver is held in the memory (corresponding to the "pause mode" in conventional systems).

It is to be understood that although the term "unloading position" is used herein, this is merely for brevity and convenience since it is also possible for the vehicle to be loaded while in such an intermediate position short of the parked position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of operating a parking assistance system to park a vehicle in a parked position, comprising:
    accepting a user selection of an unloading region located on the vehicle and a user activation of an unloading mode;
    moving the vehicle to and stopping the vehicle in an unloading position before reaching the parked position, the unloading position determined by the system to facilitate access to the unloading region; and
    upon a second user activation, automatically resuming movement to the parked position.

2. The method of claim 1, wherein the parking assistance system determines the unloading position based on a distance to be left between the vehicle and an adjacent edge of a parking space.

3. The method of claim 2, wherein the distance is selectable by a user.

4. The method of claim 1, further comprising an automatic check of a state of a vehicle system prior to resuming movement to the parked position.

5. The method of claim 4, wherein the vehicle system comprises a vehicle door and/or a gearshift selector.

6. The method of claim 4, further comprising providing an indication to a user if the state of the vehicle system is not appropriate for resuming movement to the parked position.

7. A method of operating a parking assistance system of a vehicle, comprising:

in response to a first activation, starting an automatic parking maneuver moving the vehicle to a parked position;

in response to a second activation, stopping the vehicle in an unloading position before reaching the parked position, the unloading position determined by the system to facilitate access to an unloading region located on the vehicle; and in response to a third activation, resuming the automatic parking maneuver.

8. The method of claim 7, wherein the unloading region is selectable by a user.

9. The method of claim 8, wherein the unloading region is selectable by the user before the automatic parking maneuver is started.

10. The method of claim 7, wherein the parking assistance system determines the unloading position based on a distance to be left between the unloading region and an adjacent edge of a parking space.

11. The method of claim 10, wherein the distance is selectable by a user.

12. The method of claim 7, wherein the second activation occurs after the start of the automatic parking maneuver and causes the vehicle to stop in the unloading position.

13. The method of claim 7, further comprising an automatic check of a state of a vehicle system prior to resuming the parking maneuver.

14. The method of claim 13, wherein the vehicle system comprises a vehicle door and/or a gearshift selector.

15. The method of claim 13, further comprising providing an indication to a user if the state of the vehicle system is not appropriate for resuming the parking maneuver.

16. The method of claim 7, wherein while the vehicle is in the unloading position, the parking assistance system remains in a condition wherein the automatic parking maneuver is not aborted by at least one of exceeding a time in the unloading position, operation of a parking brake, and operation of a gearshift selector.

17. A method of operating a parking assistance system to park a vehicle in a parked position, comprising:

moving the vehicle to and stopping the vehicle in an unloading position prior to reaching the parked position, the unloading position determined by the system to provide improved access, as compared with the parked position, to an unloading region located on the vehicle; and after a user activation, completing movement to the parked position.

18. The method of claim 17, wherein the unloading region is selectable by the user.

19. The method of claim 17, wherein the parking assistance system determines the unloading position based on a distance to be left between the unloading region and an adjacent edge of a parking space.

20. The method of claim 19, wherein the distance is selectable by a user.

* * * * *